Dec. 31, 1940.   C. J. STONE   2,227,329
AUTOMOBILE HANDY TABLE
Filed Aug. 11, 1938   2 Sheets-Sheet 1

Inventor
Carl J. Stone
By L. F. Randall
Attorney

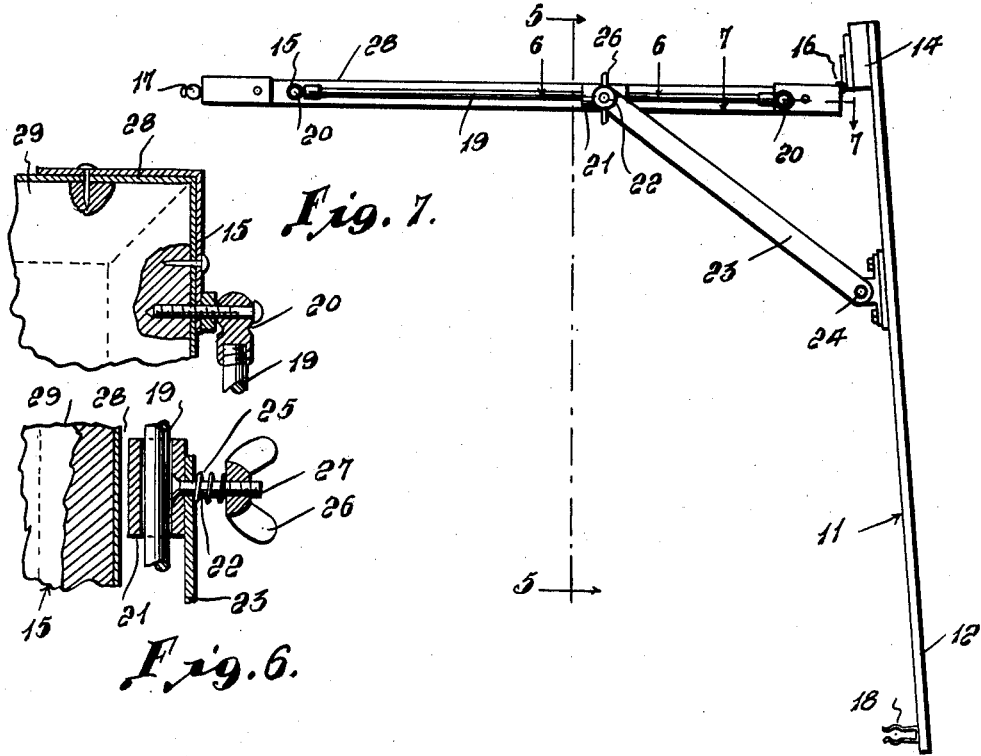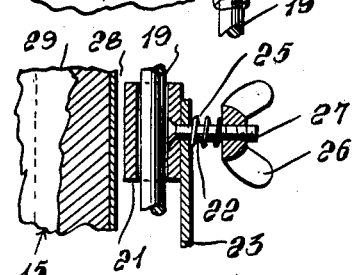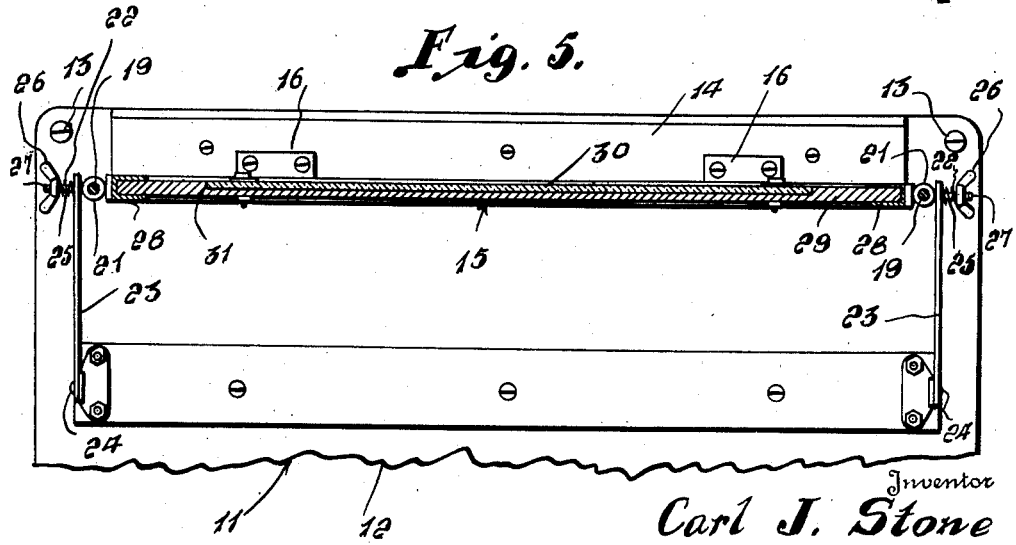

Patented Dec. 31, 1940

2,227,329

UNITED STATES PATENT OFFICE 2,227,329

AUTOMOBILE HANDY TABLE

Carl J. Stone, Charleston W. Va.

Application August 11, 1938, Serial No. 224,365

1 Claim. (Cl. 311—19)

This invention relates to a table forming an accessory or attachment for an automobile and preferably adapted for attachment to the back of the front or other appropriate seat thereof, or any convenient part of the automobile. The invention is also adapted for use on the backs of seats or adjacent parts of railway cars, aeroplanes and vehicles generally.

It is further an object to provide a construction which will normally be folded and occupy minimum space, with the operating and supporting part so arranged as to be protected by the top of the table.

The more specific objects and advantages will become apparent from a consideration of the description following taken in connection with accompanying drawings illustrating an operative embodiment.

In said drawings—

Figure 4 is a side elevation showing the parts in extended or operative condition;

Figure 5 is a sectional view taken on the plane of line 5—5 of Figure 4;

Figure 6 is a cross sectional view taken on the line 6—6 of Figure 4; and

Figure 7 is a cross sectional view taken on the line 7—7 of Figure 4.

Figure 1:
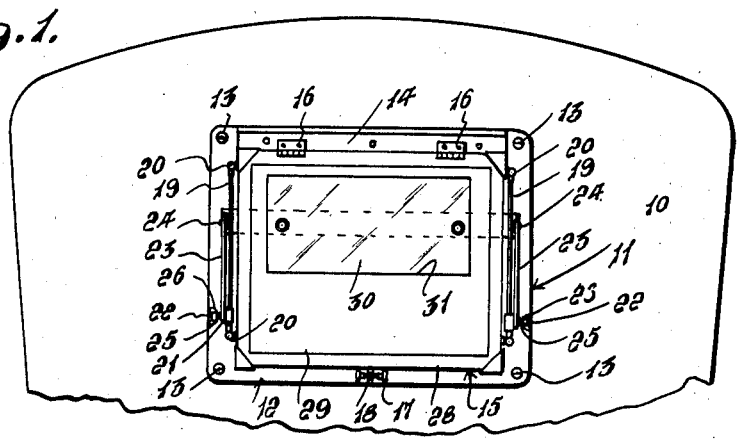
Figure 1 is a view showing a vehicle seat in rear elevation with my improvements attached thereto and in folded condition.

Referring specifically to the drawings wherein like reference characters designate like or similar parts, 10 represents a conventional back of a vehicle seat, such as that of an automobile, railway car, aeroplane or the like. To the back surface of such part 10, my improvements, generally designated 11, are fastened.

Figure 2:
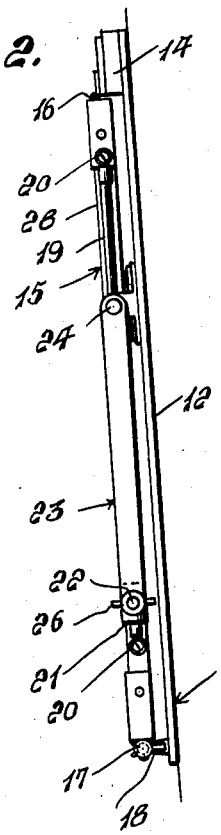
Figure 2 is a vertical edge view of the parts of Figure 1.
Figure 3:
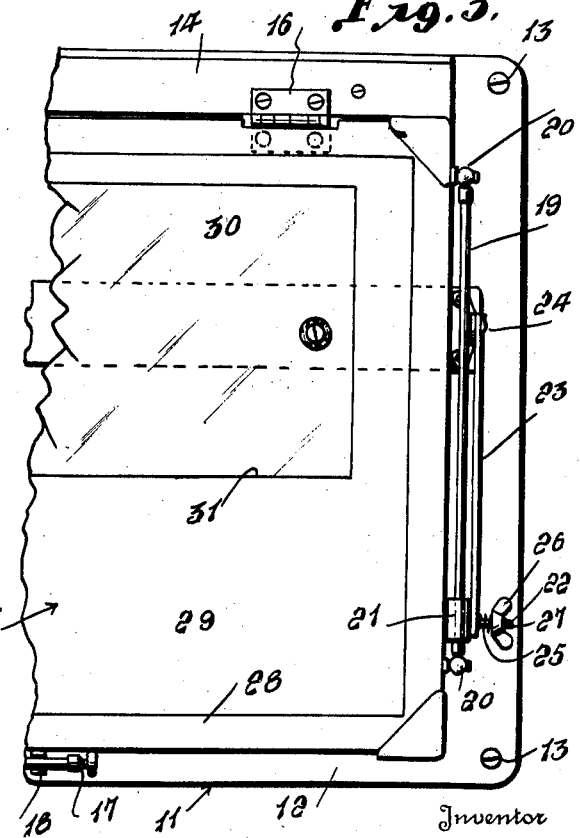
Figure 3 is an enlarged elevation, partly broken away, of the improvements in folded condition.

Said improvements include an attaching plate 12 which is suitably secured as at 13 to said back 10. Across the top of the plate 12 a bar 14 is fastened and a table top member 15 is hinged at 16 to said bar 14. Such top member 15 has a catch or rod 17 at one edge which is adapted for releasable engagement with a U-shaped resilient clamp 18 carried by the plate 12, in order to normally retain the top in a lowered or folded condition as best shown in Figure 2.

Said top 15 at both end edges has round rods 19 fastened in offset relation thereto by means of brackets 20. Sleeves 21 are slidable along the rods 19 and bolt shanks 22 extend laterally therefrom to which links 23 are pivoted and which links are also pivoted at 24 to the plate 12. Expansive coil springs 25 surround the shanks 22, and they are held at the desired tension by means of winged nuts 26 screw threaded at 27 on said shanks 22.

The table top 15 may be used to support any desired articles for instance food articles such as are usually sold by curb service, but it may be used to support any other article, for instance a portable typewriter, or even serve as a writing desk, card table or the like.

The top 15 may have a marginal frame 28 of angular cross section, preferably U-shaped, in the groove of which a board or panel 29 may be secured, and for which the outer flange of the frame 28 forms a raised surrounding rim to guard against displacement of articles on the top and for other purposes.

The top may if desired serve as a make-up table also, since a mirror 30 may be secured within a depression 31 in the panel 29.

The structure may also serve as a rack since magazines, papers or the like may be placed in the space between the top and plate 12, when the parts are in folded condition. Attention is also directed to the fact that the rods 19, links 23 and associated parts are all substantially within the thickness of the top 15, which is offset from the plate 12, and hence will be protected to a considerable extent thereby.

Various changes may be resorted to provided they fall within the spirit and scope of the invention.

I claim as my invention:

An article of the class described having a table, an attaching plate for said table, a bar at the top of the attaching plate, means hinging said table to the bar, a rod fastened to each of the edges of the table at a right angle to the hinging axis of the table, a sleeve slidable along each rod and located at the lower ends of the rods when the table is folded, links shorter than the rods located outwardly of the rods and pivoted to the attaching plate, bolt members carried by the sleeves extending through the links, spring means on the bolt members expansive and frictionally binding the links and adjacent sleeves, and means spaced below the bar extending across the attaching plate behind the table forming the pivotal support for said links, said links being movable to diagonal positions through lifting of the table to form supports for the table.

CARL J. STONE.